(12) United States Patent
Kim

(10) Patent No.: US 12,388,541 B2
(45) Date of Patent: Aug. 12, 2025

(54) WIRELESS TRANSMITTING DEVICE AND WIRELESS DISPLAY SYSTEM

(71) Applicant: LG ELECTRONICS INC., Seoul (KR)

(72) Inventor: Dong Sung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 70 days.

(21) Appl. No.: 18/355,295

(22) Filed: Jul. 19, 2023

(65) Prior Publication Data

US 2024/0250762 A1 Jul. 25, 2024

(30) Foreign Application Priority Data

Jan. 20, 2023 (KR) .................. 10-2023-0009016

(51) Int. Cl.
- *H04N 5/38* (2006.01)
- *H04B 17/23* (2015.01)
- *H04B 17/318* (2015.01)
- *H04B 17/336* (2015.01)
- *H04N 17/00* (2006.01)

(52) U.S. Cl.
CPC ........... *H04B 17/23* (2015.01); *H04B 17/318* (2015.01); *H04B 17/336* (2015.01); *H04N 17/004* (2013.01)

(58) Field of Classification Search
CPC ........ H04N 17/004; H04N 5/38; H04B 17/23; H04B 17/318; H04B 17/336
USPC ....................................................... 348/184
See application file for complete search history.

(56) References Cited

U.S. PATENT DOCUMENTS

| | | | |
|---|---|---|---|
| 10,341,722 B2* | 7/2019 | Petruzzelli | H04N 21/4126 |
| 11,553,249 B1* | 1/2023 | Lee | H04N 21/43637 |
| 2014/0289782 A1* | 9/2014 | Kawasaki | H04N 5/38 |
| | | | 725/81 |

FOREIGN PATENT DOCUMENTS

| | | |
|---|---|---|
| KR | 10-0693643 | 3/2007 |
| KR | 10-2010-0042419 | 4/2010 |
| KR | 10-2011-0038317 | 4/2011 |
| KR | 10-2014-0037363 | 3/2014 |
| KR | 10-2019-0127610 | 11/2019 |

(Continued)

OTHER PUBLICATIONS

Korean Intellectual Property Office Application No. 10-2023-0009016, Office Action dated Jan. 10, 2025, 5 pages.

*Primary Examiner* — Trang U Tran
(74) *Attorney, Agent, or Firm* — LEE, HONG, DEGERMAN, KANG & WAIMEY

(57) ABSTRACT

The present disclosure allows a user to intuitively recognize wireless quality, and a wireless transmitting device according to an embodiment of the present disclosure comprises a compression chip configured to compress video data; a radio frequency (RF) transmission interface including a plurality of transmitting antennas and configured to transmit the compressed image data to a wireless receiving device; and a processor configured to: obtain a compression ratio of the video data, determine a signal strength state of a signal transmitted from the RF transmitting interface to an RF receiving interface of the wireless receiving device based on the obtained compression ratio, and transmit signal strength state information on the determined signal strength state to the wireless receiving device.

15 Claims, 15 Drawing Sheets

(56) References Cited

FOREIGN PATENT DOCUMENTS

WO  WO-2020015582 A1 * 1/2020 ........... H04B 17/318

* cited by examiner

FIG. 5

| signal strength state | picture quality |
|---|---|
| strong state | high picture quality |
| normal state | standard picture quality |
| low state | low picture quality |
| weak state | disconnected |

| Source | MCS number | data transmission rate (Gbps) | RSSI (bBm) | SNR (dB) | |
|---|---|---|---|---|---|
| 4K120P | 20 | 10.2 | -55 | 24 | |
| | 20 | 9.7 | -56 | 24 | |
| | 19 | 9.2 | -57 | 23 | signal strength strong (high picture quality) |
| | 19 | 8.7 | -58 | 23 | |
| | 18 | 8.2 | -59 | 21 | |
| | 18 | 7.8 | -60 | 21 | |
| | 16 | 7.3 | -62 | 18 | |
| | 15 | 6.8 | -64 | 17 | |
| | 14 | 6.3 | -66 | 16 | signal strength normal (standard picture quality) |
| | 14 | 5.8 | -68 | 16 | |
| | 13 | 5.3 | -70 | 14 | |
| | 13 | 4.9 | -73 | 14 | |
| | 13 | 4.4 | -76 | 14 | signal strength low (low picture quality) |
| | 12 | 3.9 | -78 | 13 | |
| | 10 | 3.4 | -80 | 11 | |
| | 9 | 2.9 | -85 | 10 | disconnected |
| | 8 | 2.5 | -90 | 8 | |

| Source | MCS number | data transmission rate (Gbps) | compression Rate |
|---|---|---|---|
| 4K120P | 20 | 10.2 | 3.3 |
| | 20 | 9.7 | 3.5 |
| | 19 | 9.2 | 3.8 |
| | 19 | 8.7 | 4.0 |
| | 18 | 8.2 | 4.3 |
| | 18 | 7.8 | 4.6 |
| | 16 | 7.3 | 5.0 |
| | 15 | 6.8 | 5.5 |
| | 14 | 6.3 | 6.0 |
| | 14 | 5.8 | 6.7 |
| | 13 | 5.3 | 7.5 |
| | 13 | 4.9 | 8.6 |
| | 13 | 4.4 | 10.0 |
| | 12 | 3.9 | 12.0 |
| | 10 | 3.4 | 15.0 |
| | 9 | 2.9 | 20.0 |
| | 8 | 2.5 | 30.0 |

→ signal strength strong (high picture quality)

→ signal strength normal (standard picture quality)

→ signal strength low (low picture quality)

→ disconnected

| Source | MCS number | data transmission rate (Gbps) | RSSI (bBm) | SNR (dB) | compression Rate |
|---|---|---|---|---|---|
| 4K120P | 20 | 10.2 | -55 | 24 | 3.3 |
| | 20 | 9.7 | -56 | 24 | 3.5 |
| | 19 | 9.2 | -57 | 23 | 3.8 |
| | 19 | 8.7 | -58 | 23 | 4.0 |
| | 18 | 8.2 | -59 | 21 | 4.3 |
| | 18 | 7.8 | -60 | 21 | 4.6 |
| | 16 | 7.3 | -62 | 18 | 5.0 |
| | 15 | 6.8 | -64 | 17 | 5.5 |
| | 14 | 6.3 | -66 | 16 | 6.0 |
| | 14 | 5.8 | -68 | 16 | 6.7 |
| | 13 | 5.3 | -70 | 14 | 7.5 |
| | 13 | 4.9 | -73 | 14 | 8.6 |
| | 13 | 4.4 | -76 | 14 | 10.0 |
| | 12 | 3.9 | -78 | 13 | 12.0 |
| | 10 | 3.4 | -80 | 11 | 15.0 |
| | 9 | 2.9 | -85 | 10 | 20.0 |
| | 8 | 2.5 | -90 | 8 | 30.0 |

→ signal strength strong (high picture quality)

→ signal strength normal (standard picture quality)

→ signal strength low (low picture quality)

→ disconnected

WIRELESS TRANSMITTING DEVICE AND WIRELESS DISPLAY SYSTEM

CROSS-REFERENCE TO RELATED APPLICATION

Pursuant to 35 U.S.C. § 119, this application claims the benefit of earlier filing date and right of priority to Korean Application No. 10-2023-0009016, filed on Jan. 20, 2023, the contents of which are all incorporated by reference herein in its entirety.

TECHNICAL FIELD

The present disclosure relates to a wireless display system for wirelessly transmitting and receiving A/V data.

BACKGROUND

A wireless display system provides a TV service that an A/V transmitting device transmits a compressed audio/video (A/V) signal to an A/V receiving device through a wireless connection, and the A/V receiving device restores the compressed A/V signal to output the restored A/V signal.

In the case of the wireless display system, since radio frequency (RF) communication is performed between the A/V transmitting device and the A/V receiving device through antennas, the arrangement positional relationship between transmission antennas and reception antennas is important for wireless quality.

Conventionally, a user can roughly check wireless connection quality by checking LED color or signal strength when adjusting pointing (panning/tilting) of an antenna according to arrangement conditions of transmitting antennas and receiving antennas.

However, since the wireless connection quality is not intuitively provided to the user, it is difficult for the user to set an antenna arrangement having optimal connection quality.

In addition, even if the quality of the wireless connection is good, there is a problem in that signal strength is not accurately reflected due to an obstacle between the A/V transmitting device and the A/V receiving device.

DISCLOSURE

Technical Problem

An object of the present disclosure is to intuitively provide connection quality between an A/V transmitting device and an A/V receiving device in a wireless display system.

An object of the present disclosure is to accurately provide a signal strength state even if an obstacle exists between an A/V transmitting device and an A/V receiving device.

Technical Solution

A wireless transmitting device according to an embodiment of the present disclosure comprises a compression chip configured to compress video data; a radio frequency (RF) transmission interface including a plurality of transmitting antennas and configured to transmit the compressed image data to a wireless receiving device; and a processor configured to: obtain a compression ratio of the video data, determine a signal strength state of a signal transmitted from the RF transmitting interface to an RF receiving interface of the wireless receiving device based on the obtained compression ratio, and transmit signal strength state information on the determined signal strength state to the wireless receiving device.

A wireless display system including a wireless transmitting device and a wireless receiving device according to an embodiment of the present disclosure, wherein the wireless transmitting device configured to: obtain a compression ratio of the video data, determine a signal strength state of a signal transmitted from the RF transmitting interface to an RF receiving interface of the wireless receiving device based on the obtained compression ratio, and transmit signal strength state information on the determined signal strength state to the wireless receiving device, wherein the wireless receiving device configured to: display the received signal strength state information.

Advantageous Effects

According to an embodiment of the present disclosure, a user can intuitively perceive wireless quality as signal strength state are linked and displayed through an LED of an A/V transmitting device and a display of an A/V receiving device.

In addition, the signal strength state and the picture quality level are provided together so that the picture quality level can be intuitively provided to the user.

In addition, guides for manipulating the transmitting antennas are provided according to the guide image, so that the user can easily set the optimal wireless quality.

DESCRIPTION OF DRAWINGS

FIG. 5 is a diagram illustrating picture quality corresponding to each signal strength state according to an embodiment of the present disclosure.

FIG. 6 is a diagram illustrating an example of a first MCS table according to an embodiment of the present disclosure.

FIG. 7 is a diagram illustrating an example of a second MCS table according to an embodiment of the present disclosure.

FIG. 8 is a diagram illustrating an example of a third MCS table according to an embodiment of the present disclosure.

BEST MODE

A video/audio (hereinafter referred to as A/V) transmitting device according to an embodiment of the present disclosure is an intelligent device in which a computer support function is added to a broadcast reception function, for example, and an Internet function is added while being faithful to the broadcast reception function, so the A/V transmitting can be equipped with a more user-friendly interface in comparison with a handwriting type input device, a touch screen, or a space remote controller, etc.

In addition, by being connected to the Internet and a computer by supporting a wired or wireless Internet function, it is possible to perform functions such as e-mail, web browsing, banking, or game. A standardized universal OS can be used for these various functions.

Therefore, since various applications can be freely added or deleted on the A/V transmitting device described in this disclosure, for example, on a general-purpose OS kernel, various user-friendly functions can be performed.

Figure 1:
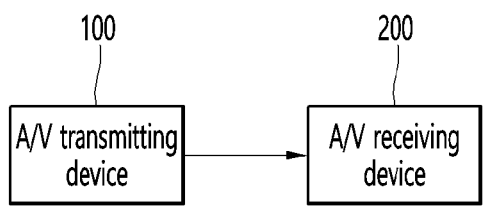
FIGS. 1 and 2 are diagrams for describing a configuration of a display system according to an embodiment of the present disclosure.
Figure 2:
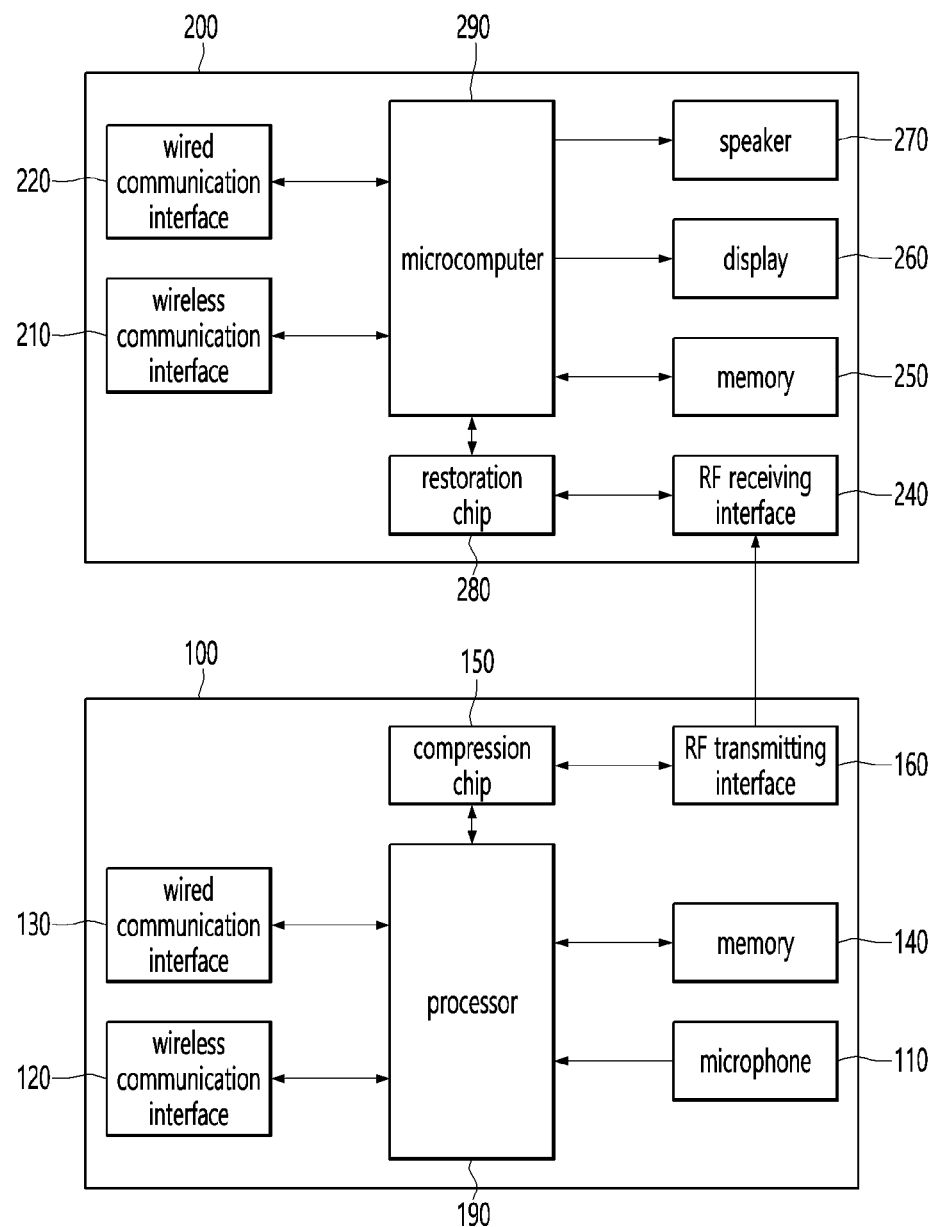

FIGS. 1 and 2 are diagrams for describing the configuration of a wireless display system according to an embodiment of the present disclosure.

Referring to FIG. 1, a wireless display system 1 according to an embodiment of the present disclosure includes an A/V transmitting device 100 and an A/V receiving device 200.

In the wireless display system 1 is a system that the A/V transmitting device 100 wirelessly transmits A/V data to the A/V receiving device 200, and the A/V receiving device 200 outputs the A/V data.

The A/V transmitting device 100 may be a device capable of encoding video and audio and wirelessly transmitting the encoded content video and audio.

A/V transmitting device 100 may be a set-top box.

The A/V transmitting device 100 may be connected to an external device such as a set-top box or USB memory. The A/V transmitting device 100 may transmit a video signal or an audio signal received from a connected external device to the A/V receiving device 200.

The A/V receiving device 200 may be a display device capable of wirelessly receiving encoded video and audio and decoding the received video and audio.

The A/V transmitting device 100 and the A/V receiving device 200 may constitute a video wall display system.

In a video wall, having a display with a thin bezel plays an important role in visualizing content videos. For the thin bezel of the display, it is efficient to have only the components that can play the minimum role, and to perform the circuits or components for the main functions in a separate device.

The A/V transmitting device 100 may determine a type of content video input from the outside and determine a compression rate of the content video based on the determined type. The compression rate of content video may be defined as the ratio of the size of video data before encoding to the size of video data after encoding.

The type of content video may include a still video type, a general video type, and a game video type.

The A/V transmitting device 100 may compress the content video according to the determined compression ratio and wirelessly transmit the compressed content video to the A/V receiving device 200.

The A/V receiving device 200 may restore the compressed content video received from the A/V transmitting device 100 and display the restored content video on a display.

FIG. 2 is a block diagram illustrating detailed configurations of the A/V transmitting device 100 and the A/V receiving device 200.

Referring to FIG. 2, the A/V transmitting device 100 includes a microphone 110, a wireless communication interface 120, a wired communication interface 130, a memory 140, a compression chip 150, and an RF transmitting interface 160 and the processor 190.

The microphone 110 may receive an audio signal and transmit it to the processor 190.

The microphone 110 may receive a voice uttered by a user.

The wireless communication interface 120 may include one or more of a Wi-Fi module and a Bluetooth module.

The Wi-Fi module may perform wireless communication with an external device or the A/V receiving device 200 through Wi-Fi standards.

The Bluetooth module may perform wireless communication through a Bluetooth Low Energy (BLE) standard.

The Bluetooth module may perform wireless communication with an external device such as a remote control device or the A/V receiving device 200 through a Bluetooth Low Energy (BLE) standard.

The wireless communication interface 120 may include a tuner that receives broadcast signal.

The wired communication interface 130 may be an interface for wired connection with an external device. The wired communication interface 130 may include a plurality of High Definition Multimedia Interface (HDMI) terminals or Universal Serial Bus (USB) ports.

The wired communication interface 130 may receive a video signal or an audio signal from an external device.

The memory 140 may store program for signal processing and control, and may store signal-processed video, audio, or data signal.

The memory 140 may perform a function for temporarily storing video, audio, or data signal input from the outside, and may store information about a predetermined image through a channel storage function.

The compression chip 150 may compress a video signal or an audio signal input from the outside and transmit the compressed signal to the RF transmitting interface 160.

The compression chip 150 may include an encoder for compressing a video signal or an audio signal.

The RF transmitting interface 160 may transmit the A/V signal to the RF receiving interface 240 of the A/V receiving device 200 through Radio Frequency (RF) communication.

The RF transmitting interface 160 may include one or more antennas.

The RF transmitting interface 160 may transmit the compressed A/V signal in digital form to the RF receiving interface 240.

The RF transmitting interface 160 may transmit A/V signals to the RF receiving interface 240 through one or more channels.

The processor 190 may generally control the operation of the A/V transmitting device 100. The processor 190 may be referred to as a Main System on Chip (Main SoC).

The processor 190 may also include a compression chip 150.

The A/V receiving device 200 includes a wireless communication interface 210, a wired communication interface 220, a RF receiving interface 240, a memory 250, a display 260, a speaker 270, and a restoration chip 280 and a mi-com(microcomputer) 290.

The wireless communication interface 210 may include a Wi-Fi module, a Bluetooth module, and an IR module.

The Wi-Fi module may perform wireless communication through the Wi-Fi standard.

The Wi-Fi module may perform wireless communication with an external device or the A/V transmitting device 100 through the Wi-Fi standard.

The Bluetooth module may perform wireless communication through a Bluetooth Low Energy (BLE) standard.

The Bluetooth module may perform wireless communication with an external device such as a remote control device or the A/V transmitting device 100 through Bluetooth Low Energy (BLE) standard.

The IR module may receive a signal from the remote control device 300 to be described later through IR (Infrared) communication.

The wired communication interface 220 may be an interface for wired connection with an external device. The wired communication interface 220 may include a plurality of High Definition Multimedia Interface (HDMI) terminals or Universal Serial Bus (USB) ports.

The wired communication interface 220 may receive a video signal or an audio signal from an external device.

The RF receiving interface 240 may receive the compressed A/V signal from the RF transmitting interface 160.

The RF receiving interface 240 may include a plurality of antennas. The RF receiving interface 240 may be disposed below the display 260.

The RF receiving interface 240 may include a first antenna module and a second antenna module. Each of the first antenna module and the second antenna module may include a plurality of antennas.

The RF receiving interface 240 may receive a compressed A/V signal in digital form from the RF transmitting interface 160 and transfer the received A/V signal to the restoration chip 280.

The memory 250 may store program for signal processing and control, and may store signal-processed video, audio, or data signal.

The display 260 may display a video signal received from the microcomputer 290.

The display 260 may display a video signal according to driving of a timing controller (not shown).

The restoration chip 280 may restore the compressed A/V signal received by the RF receiving interface 240. To this end, the restoration chip 280 may include a decoder.

The microcomputer 290 may control overall operations of the A/V receiving device 200.

The microcomputer 290 may output the restored video signal through the display 260 and output the restored audio signal through the speaker 270.

Figure 3:
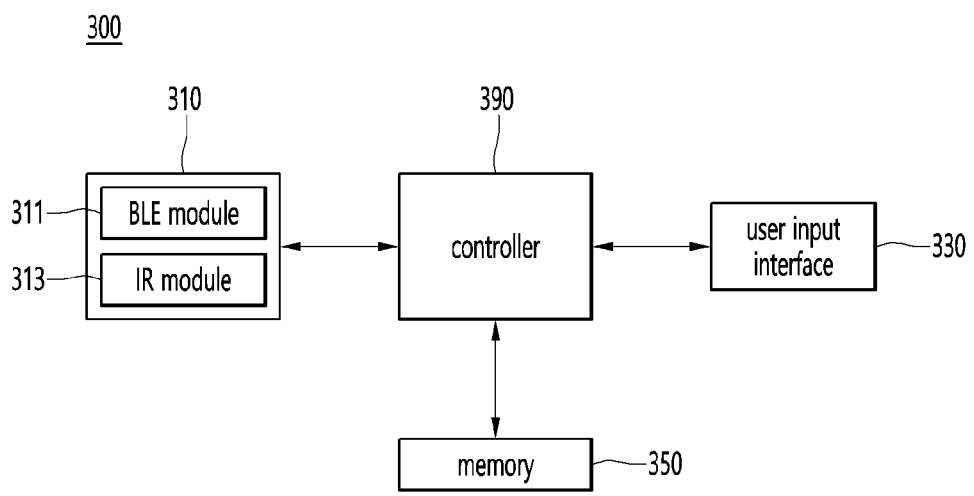
FIG. 3 is a block diagram for describing a configuration of a remote control device according to an embodiment of the present disclosure.

FIG. 3 is a block diagram for describing a configuration of a remote control device according to an embodiment of the present disclosure.

Referring to FIG. 3, the remote control device 300 may include a wireless communication interface 310, a user input interface 330, a memory 350 and a controller 390.

The wireless communication interface 310 may be an interface for performing wireless communication with the A/V transmitting device 100 or the A/V receiving device 200.

The wireless communication interface 310 may include a Bluetooth Low Energy (BLE) module 311 and an InfraRed (IR) module 313.

The BLE module 311 may transmit a signal for controlling the operation of the A/V transmitting device 100 to the A/V transmitting device 100.

The BLE module 311 may transmit a signal triggering a pairing operation of the A/V transmitting device 100 to the A/V transmitting device 100.

The user input interface 330 may include a keypad, buttons, a touch pad, or a touch screen.

The user input interface 330 may generate a control command for controlling an operation of the A/V transmitting device 100 or the A/V receiving device 200 according to a user's manipulation command.

If the user input interface 330 includes a hard key button, the user can operate the hard key by pushing the hard key button.

The user input interface 330 may include various types of input means that the user can manipulate, such as a scroll key or a jog key.

The memory 350 may store programs for operating the controller 390 and may temporarily store input/output data.

The controller 390 controls operations related to application programs and generally the overall operation of the remote control device 300.

Hereinafter, the A/V transmitting device 100 may be referred to as a wireless transmitting device, and the A/V receiving device 200 may be referred to as a wireless receiving device.

Figure 4:
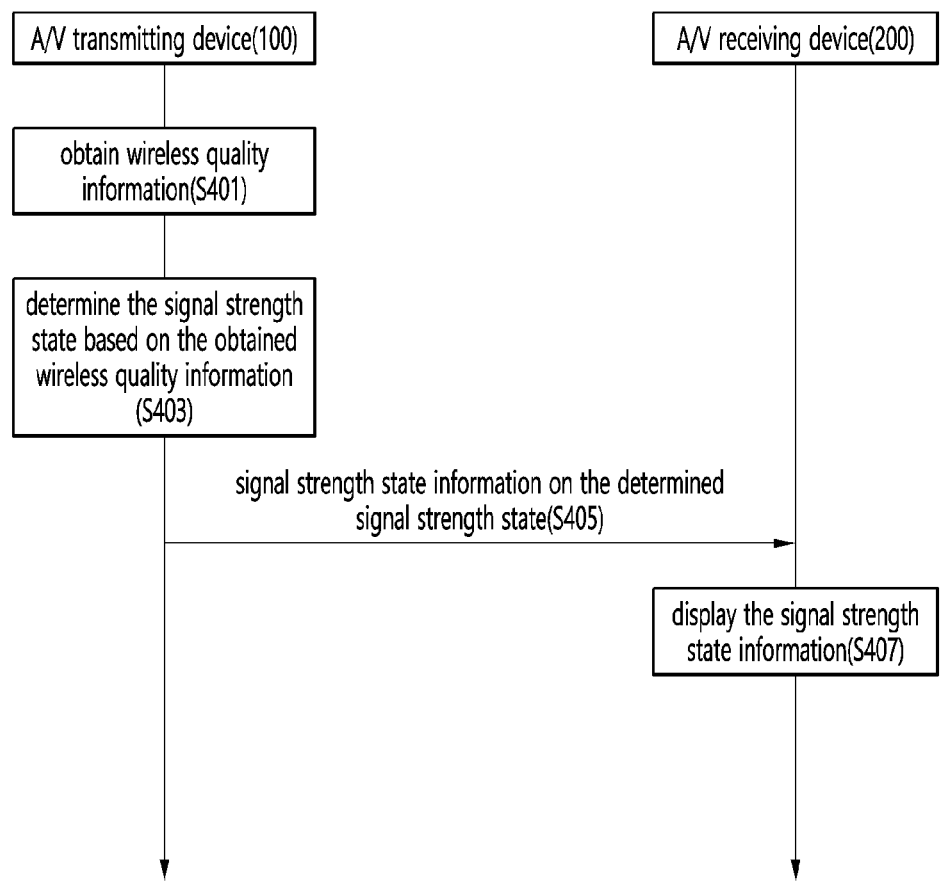
FIG. 4 is a flowchart for explaining a method of operating a wireless transmitting device according to an embodiment of the present disclosure.

FIG. 4 is a flowchart for explaining a method of operating a wireless transmitting device according to an embodiment of the present disclosure.

The processor 190 of the A/V transmitting device 100 obtains wireless quality information indicating a wireless quality status with the A/V receiving device 200 (S401).

The wireless quality information may be information indicating a quality state of wireless communication between the A/V transmitting device 100 and the A/V receiving device 200.

The wireless quality information may include information indicating a wireless quality state between the RF transmitting interface 160 and the RF receiving interface 240 of the A/V transmitting device 100.

The wireless quality information may include one or more of a Signal-to-Noise Ratio (SNR), a Received Signal Strength Indicator (RSSI), compression ratio, transmission power, and reception power.

SNR represents the ratio of the signal level to the noise level, and the unit may be dB.

The processor 190 of the A/V transmitting device 100 or the microcomputer 290 of the A/V receiving device 200 may measure the SNR.

If the microcomputer 290 of the A/V receiving device 200 measures the SNR, the microcomputer 290 may transmit the measured SNR to the A/V transmitting device 100.

The microcomputer 290 may transmit SNR to the A/V transmitting device 100 through the wireless communication interface 210 or the RF receiving interface 240.

The microcomputer 290 may measure RSSI based on the transmission signal received from the RF transmitting interface 240. The microcomputer 290 may transmit the measured RSSI to the A/V transmitting device 100 through the wireless communication interface 210 or the RF receiving interface 240.

The processor 190 of the A/V transmitting device 100 may measure the compression ratio based on the data transmission rate.

The processor 190 may obtain a data rate of compressed image data or signals transmitted from the RF transmitting interface 160 to the RF receiving interface 240.

The microcomputer 290 may measure the transmission rate of data and transmit the measured data transmission rate to the A/V transmitting device 100 through the wireless communication interface 210 or the RF receiving interface 240.

The processor 190 may determine a compression ratio of video data based on the measured data rate.

The processor 190 may obtain a compression ratio using a table in which data transmission rate and compression ratio are matched.

A table matching the data transmission rate and compression ratio may be pre-stored in the memory 140 of the A/V transmitting device 100.

The processor 190 may measure the data transmission rate and read a compression ratio corresponding to the measured data transmission rate using a table.

The compression ratio may be a ratio between the capacity of compressed data and the capacity of original data. The larger the value of the compression ratio, the worse the state of wireless quality, and the smaller the compression ratio, the better the state of wireless quality.

The processor 190 of the A/V transmitting device 100 determines the signal strength state based on the obtained wireless quality information (S403).

The signal strength state may indicate the strength of a transmission signal transmitted from the RF transmitting interface 160 to the RF receiving interface 240.

The signal strength state may include a strong state, a normal state, a low state, and a weak state (or disconnected state).

However, this is just an example, and the signal strength state may be divided into more states.

Each signal strength state may correspond to the quality of video displayed on the display 260 of the A/V receiving device 200.

FIG. 5 is a diagram illustrating picture quality corresponding to each signal strength state according to an embodiment of the present disclosure.

Referring to FIG. 5, the signal strength state of the strong state may correspond to high picture quality.

A normal signal strength state may correspond to standard picture quality.

The signal strength state of the low state may correspond to a low picture quality.

The signal strength state of the weak state may be a state in which wireless communication, which cannot be expressed in picture quality, is disconnected.

The picture quality corresponding to each signal strength state of FIG. 5 may be provided to the user through the display 260 of the A/V receiving device 200.

In another embodiment, classification of picture quality may be expressed in resolutions such as SD, HD, and FHD.

Again, FIG. 4 will be described.

The processor 190 may determine the signal strength state based on one or more factors constituting the wireless quality information.

In one embodiment, the processor 190 may determine the signal strength state using SNR and RSSI.

Specifically, the processor 190 may determine the signal strength state using a first Modulation Coding Scheme (MCS) table in which signal strength states are mapped to SNR and RSSI.

FIG. 6 is a diagram illustrating an example of a first MCS table according to an embodiment of the present disclosure.

Referring to FIG. 6, the first MCS table 600 may include combinations of MCS number, data transmission rate, RSSI, and SNR.

The MCS number may be a number for identifying each combination.

One MCS number may be matched to one combination of RSSI and SNR.

In addition, one signal strength state may be matched to each combination of RSSI and SNR.

For example, if the RSSI is −62 dBm and the SNR is 18 dB, the MCS number is 16 and the signal strength state may be strong.

The same MCS number may be matched to some combinations of RSSI and SNR.

The first MCS table 600 may be stored in the memory 140 of the A/V transmitting device 100.

The processor 190 may obtain the SNR value and the RSSI value, and determine the signal strength state corresponding to the SNR value and the SRRI value using the first MCS table 600.

The signal strength state may be any one of a strong state, a normal state, a low state, and a disconnected state.

A picture quality level may be matched to each signal strength state.

For example, the strong state may match high quality, the normal state match standard definition, and the low state match low quality.

In another embodiment, the processor 190 may determine the signal strength state using a compression ratio.

FIG. 7 is a diagram illustrating an example of a second MCS table according to an embodiment of the present disclosure.

Referring to FIG. 7, the second MCS table 700 may include combinations of MCS number, data transmission rate, and compression ratio.

The second MCS table 700 may be stored in the memory 140 of the A/V transmitting device 100.

The MCS number may be a number for identifying each combination.

One MCS number may be matched to one compression ratio. The compression ratio may be a value determined according to a data transmission rate.

As the data transmission rate increases, the compression ratio may decrease, and as the data transmission rate decreases, the compression ratio may increase.

In addition, the signal strength state may be matched to each compression ratio.

For example, the signal strength state may be strong.

The same MCS number may be matched to each of some compression ratio. For example, if the compression ratios are 4.3 and 4.6, the same MCS number 18 may be matched.

The processor 190 may measure the data transmission rate and obtain a compression ratio matching the measured data transmission rate.

The processor 190 may determine a signal strength state matching the obtained compression ratio using the second MCS table 700.

Even if the wireless quality is good based on the SNR and RSSI values, the signal strength received by the A/V receiving device 200 may be poor due to the existence of obstacle. Accordingly, the quality level of the image displayed by the A/V receiving device 200 may not be good.

If the signal strength state is determined using the compression ratio through the second MCS table 700 of FIG. 7, even if the SNR and RSSI values indicate a good quality state, an accurate signal strength state considering the presence of the obstacle may be provided.

The user can manipulate the transmitting antennas in the direction and angle of the transmitting antennas having optimal wireless quality according to the provision of the correct signal strength state.

In another embodiment, the processor 190 may determine the signal strength state using SNR, RSSI, and compression ratio.

FIG. 8 is a diagram illustrating an example of a third MCS table according to an embodiment of the present disclosure.

Referring to FIG. 8, the third MCS table 800 may include combinations of MCS number, data transmission rate, RSSI, SNR, and compression ratio.

The third MCS table 800 may be stored in the memory 140 of the A/V transmitting device 100.

The MCS number may be a number for identifying each combination.

One MCS number may be matched between each RSSI, each SNR, and each compression ratio. The compression ratio may be a value determined according to a data transmission rate.

As the data transmission rate increases, the compression ratio may decrease, and as the data transmission rate decreases, the compression ratio may increase.

In addition, the signal strength state may be matched between each RSSI, each SNR, and each compression ratio.

For example, the signal strength state may be any one of strong, normal, low, and disconnected.

The processor 190 may determine the signal strength state by prioritizing the compression ratio.

The processor 190 may use the third MCS table 800 to first determine the signal strength state matching the obtained compression ratio.

Even if the signal strength state matching the RSSI and SNR is determined to be the strong state, the processor 190 may determine the signal strength state as the normal state if the compression ratio is 6.0.

This is because even if the wireless quality is good based on the SNR and RSSI values, the signal strength received by the A/V receiving device 200 may be poor due to the existence of obstacle. Accordingly, the quality level of the image displayed by the A/V receiving device 200 may not be good.

If the signal strength state is determined using the compression ratio through the third MCS table 800 of FIG. 8, even if the SNR and RSSI values indicate a good quality state, an accurate signal strength state considering the presence of the obstacle may be provided.

The user can manipulate the transmitting antennas in the direction and angle of the transmitting antennas having optimal wireless quality according to the provision of the correct signal strength state.

Again, FIG. 4 will be described.

The processor 190 of the A/V transmitting device 100 transmits signal strength state information on the determined signal strength state to the A/V receiving device 200 (S405).

The signal strength state information may include the determined signal strength state.

In another embodiment, the signal strength state information may further include the determined signal strength state and a picture quality level corresponding thereto.

The microcomputer 290 of the A/V receiving device 200 displays the received signal strength state information on the display 260 (S407).

The microcomputer 290 may display signal strength state information through various types of indicators or icons.

The microcomputer 290 may indicate the signal strength state by changing the color of the indicator or icon.

Figure 9A:
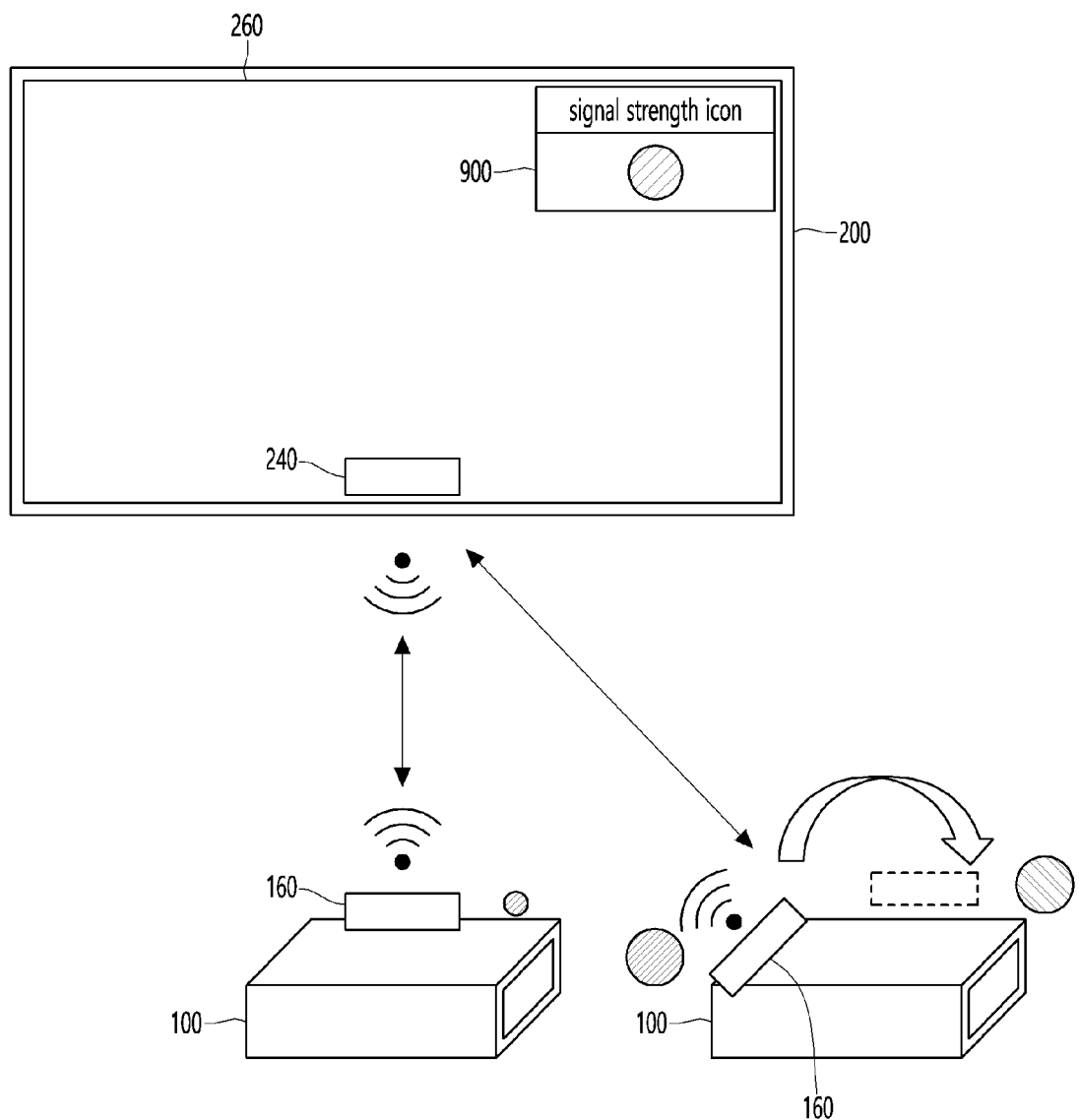
FIGS. 9A and 9B are diagrams illustrating an example of displaying information indicating a signal strength state according to an embodiment of the present disclosure.
Figure 9B:
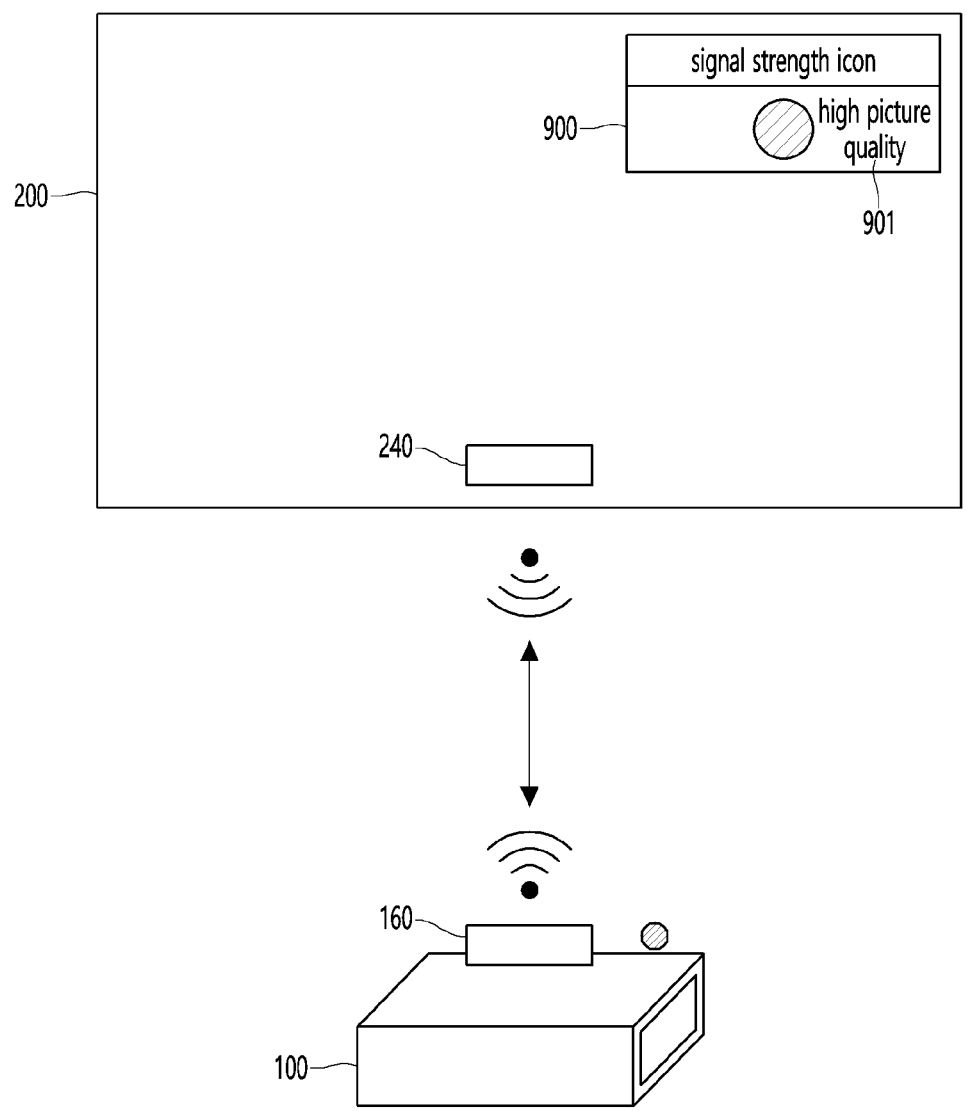

FIGS. 9A and 9B are diagrams illustrating an example of displaying information indicating a signal strength state according to an embodiment of the present disclosure.

It is assumed that the signal strength state between the RF transmitting interface 160 of the A/V transmitting device 100 and the RF receiving interface 240 of the A/V receiving device 200 has been determined to be a strong state.

The A/V transmitting device 100 may transmit signal strength state information to the A/V receiving device 200.

As shown in FIG. 9A, the A/V receiving device 200 may display a signal strength icon 900 based on the received signal strength state information.

The signal strength icon 900 may have a blue color representing a strong state.

A normal state can be set to green and a low state to yellow, but this is just an example.

An LED provided in the A/V transmitting device 100 may also display the determined signal strength state together.

The LED provided in the A/V transmitting device 100 may display blue indicating the strong state.

As described above, according to an embodiment of the present disclosure, the signal strength state is interlocked and displayed through the LED of the A/V transmitting device 100 and the display 260 of the A/V receiving device 200, so that the user can intuitively perceive the wireless quality.

Meanwhile, the A/V receiving device 200 may display signal strength state information if the direction of the RF transmitting interface 160 of the A/V transmitting device 100 is changed.

Specifically, if the signal strength state between the RF transmitting interface 160 of the A/V transmitting device 100 and the RF receiving interface 240 of the A/V receiving device 200 is changed. the A/V receiving device 200 may display the signal strength state information on the display 260.

The A/V receiving device 200 may display the signal strength state information indicating the disconnection state on the display 260 if the signal strength state is changed from the strong state to the disconnection state.

The A/V transmitting device 100 may detect a change in the signal strength state and transmit a command for requesting display of the signal strength state to the A/V receiving device 200 according to the detection result.

The A/V receiving device 200 may display the signal strength state information on the display 260 according to the received command.

The A/V receiving device 200 may automatically end the display of the signal strength status information if the signal strength status becomes the strong state.

In another embodiment, the A/V receiving device 200 may display a signal strength icon 900 indicating a strong state and text 901 indicating the high quality, as shown in FIG. 9B.

The user can more intuitively grasp the wireless connection state of the wireless display system through the signal strength icon 900 and the text 901.

Figure 10A:
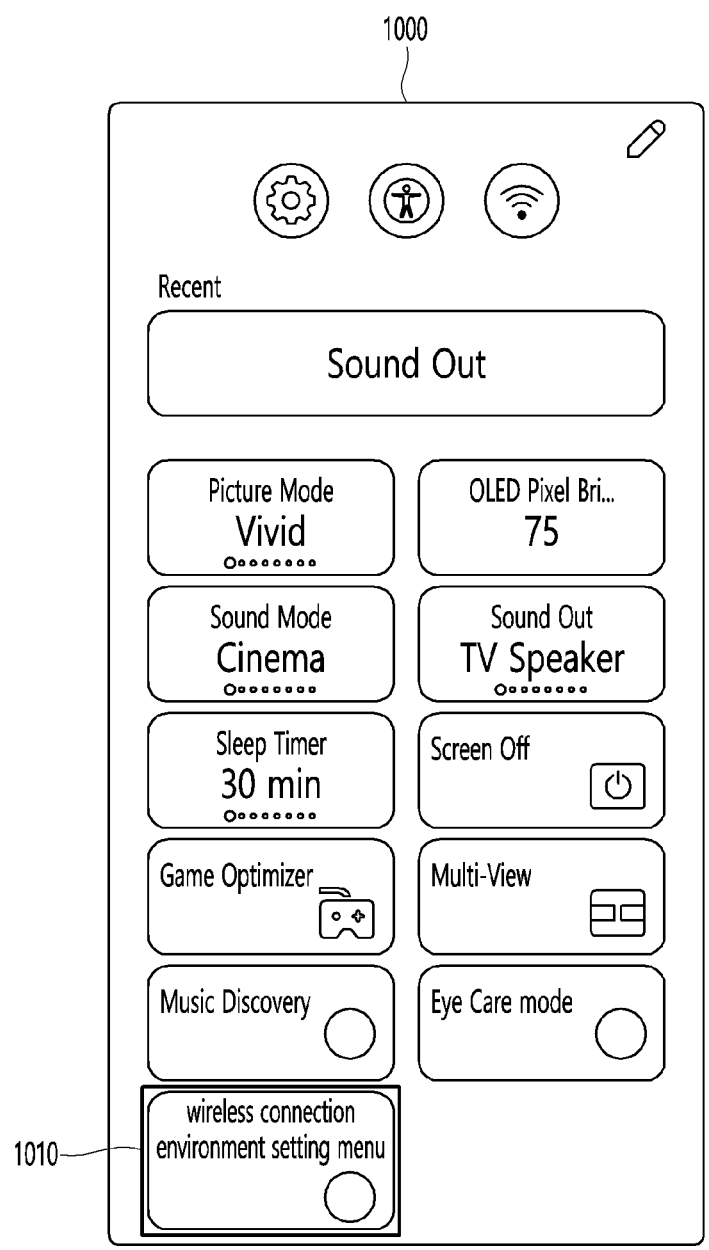
FIGS. 10A and 10B are diagrams illustrating a wireless connection environment setting menu according to an embodiment of the present disclosure.
Figure 10B:
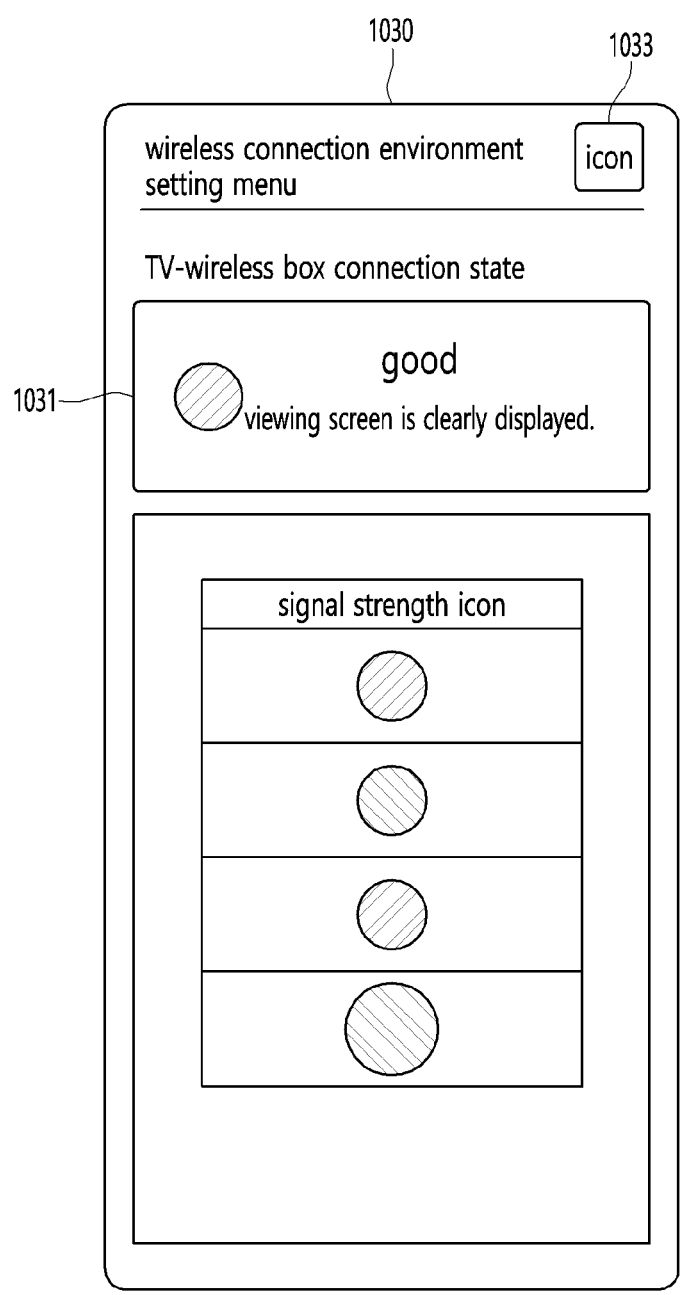

FIGS. 10A and 10B are diagrams illustrating a wireless connection environment setting menu according to an embodiment of the present disclosure.

Referring to FIG. 10A, a setting menu 1000 for setting a wireless display system may include a wireless connection environment setting menu 1010.

The setting menu 1000 may be displayed on the A/V receiving device 200.

The wireless connection environment setting menu 1010 may be a menu for setting related to a wireless connection between the A/V transmitting device 100 and the A/V receiving device 200.

If the wireless connection environment setting menu 1010 is selected in the A/V receiving device 200, as shown in FIG. 10B, information 1031 and a toggle icon 1033 representing the signal strength state between the A/V transmitting device 100 and the A/V receiving device 200 may be displayed.

The user can check the current connection state of the wireless display system through the information 1031 indicating the displayed signal strength state.

The toggle icon 1033 may be an icon capable of turning on or off the signal strength icon.

Figure 11:
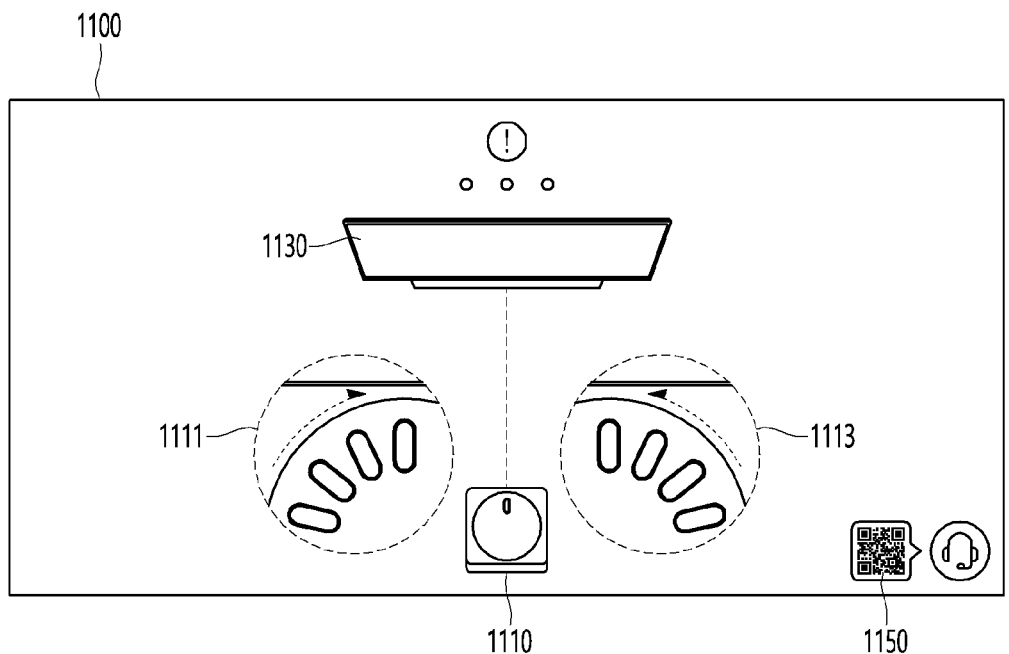
FIG. 11 is a diagram for explaining an example of providing a guide image for guiding a signal strength state according to an embodiment of the present disclosure.

FIG. 11 is a diagram for explaining an example of providing a guide image for guiding a signal strength state according to an embodiment of the present disclosure.

The A/V transmitting device 100 may transmit, to the A/V receiving device 200, a guide image for changing one or more of the direction or the angle of the transmitting antennas.

The guide image may be included in the signal strength state information of FIG. 4 and transmitted.

The A/V transmitting device 100 may transmit a guide image through the wireless communication interface 120.

The A/V receiving device 200 may display the received guide image on the display 260.

In another embodiment, the guide image may be stored in the memory 250 of the A/V receiving device 200.

For example, if the signal strength state is determined to be the weak state, the A/V transmitting device 100 may transmit a control signal to display a guide image to the A/V receiving device 200 through the wireless communication interface 120.

The A/V receiving device 200 may display a guide image on the display 260 according to the received control signal.

The guide image 1100 may include a box image 1110 corresponding to the A/V transmitting device 100, a TV image 1130 corresponding to the A/V receiving device 200, and direction adjustment guide images 1111 and 1113 for guiding direction adjustment (or angle adjustment) of the transmitting antennas included in the A/V transmitting device 100.

The guide image 1100 may further include a QR code 1150 for outputting a guide for adjusting the direction or angle of transmitting antennas by voice.

As such, according to an embodiment of the present disclosure, a guide for manipulation of transmitting antennas is provided according to the guide image 1100 even if the wireless connection is disconnected, so that the user can easily set the optimal wireless quality.

Figure 12A:
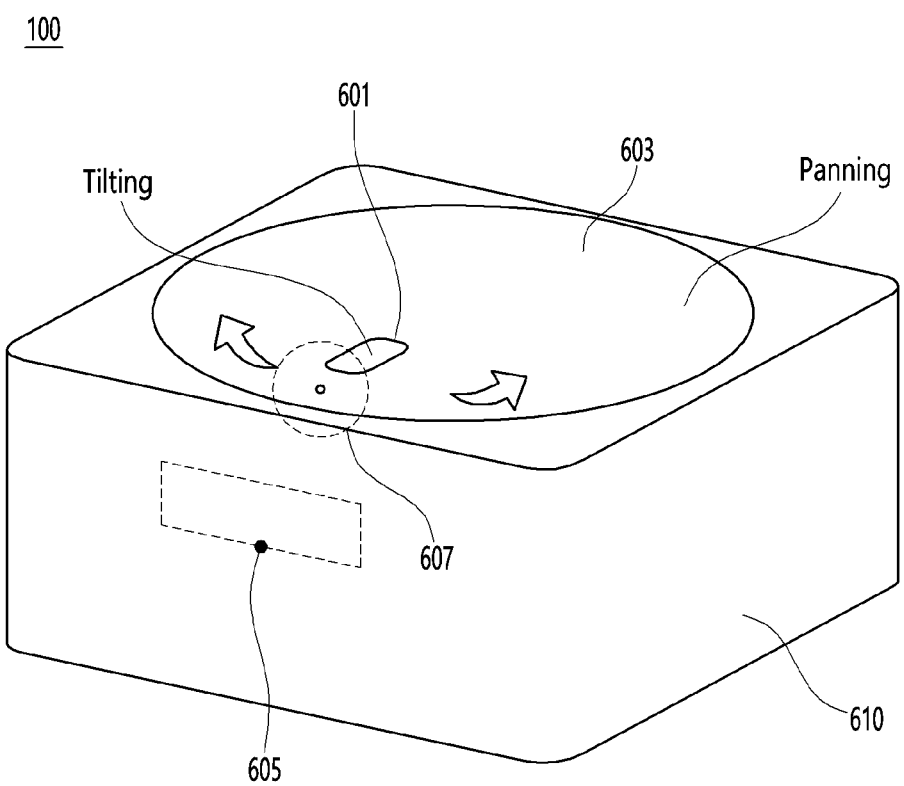
FIGS. 12A and 12B are diagrams for explaining the structure of an A/V transmitting device according to an embodiment of the present disclosure.
Figure 12B:
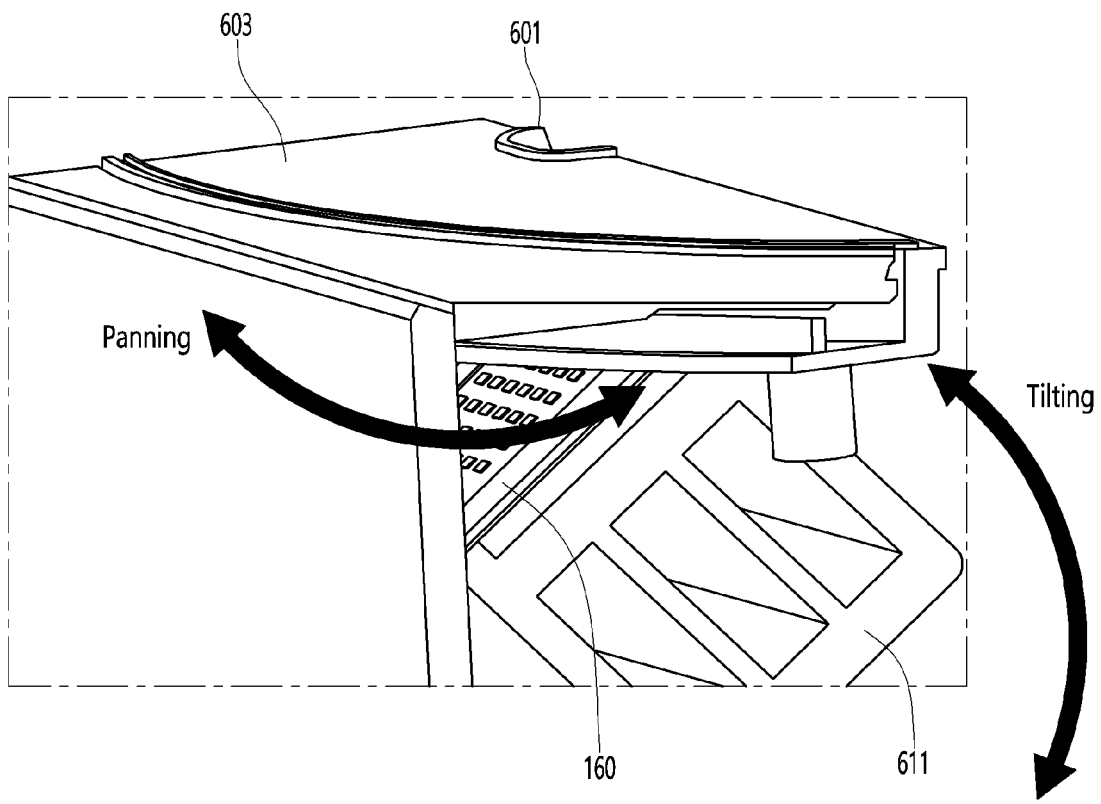

FIGS. 12A and 12B are diagrams for explaining the structure of an A/V transmitting device according to an embodiment of the present disclosure.

FIG. 12A is a perspective view of the A/V transmitting device 100, and FIG. 12*b* is a diagram illustrating the internal structure of the A/V transmitting device 100.

Referring to FIG. 12A, the A/V transmitting device 100 may include a box 610, a lever accommodating portion 601 accommodating a lever 601*a*, a rotating fan 603, a power state display unit 605, and a communication quality status display unit 607.

The inside of the box 610 may include components of the A/V transmitting device 100 described in FIG. 2.

The lever 601*a* may be a means for controlling (tilting control) the vertical direction of the RF transmitting interface 160 shown in FIG. 12B.

The rotation fan 603 may be a means for controlling (panning control) a horizontal rotation direction of the RF transmitting interface 160 shown in FIG. 12B.

The power state display unit 605 may indicate a power on or off state of the A/V transmitting device 100.

The power state indicator 605 may include one or more LEDs.

The communication quality status display unit 607 may indicate a communication quality status between the A/V transmitting device 100 and the A/V receiving device 200.

The communication quality status display unit 607 may include one or more LEDs.

The communication quality status display unit 607 may drive an LED displaying a color associated with the signal strength icon displayed on the display 260 of the A/V receiving device 200.

The processor 190 may receive a pointing correction input through the lever 601*a* or the rotating fan 603.

The processor 190 may tilt the RF transmitting interface 160 including the transmitting antennas in a vertical direction according to an input for moving the lever 601*a*.

The RF transmitting interface 160 may include a substrate and a plurality of transmitting antennas.

The RF transmitting interface 160 may be provided on top of a heat sink 611 discharging heat generated inside the box 610.

The processor 190 may pan the RF transmitting interface 160 including the transmitting antennas in the left and right directions according to the input for moving the rotating fan 603.

While viewing the guide image 1100 of FIG. 11, the user may operate the lever 601*a* or the rotating fan 603 to perform antenna pointing correction.

According to an embodiment of the present disclosure, the above-described method may be implemented with codes readable by a processor on a medium in which a program is recorded. Examples of the medium readable by the processor include a ROM, a RAM, a CD-ROM, a magnetic tape, a floppy disk, an optical data storage device, and the like.

The display device described above is not limitedly applicable to the configuration and method of the above-described embodiments, and the embodiments are configured by selectively combining all or part of each of the embodiments such that various modifications may be made.

The invention claimed is:

1. A wireless transmitting device, comprising:
   a compression chip configured to compress video data;
   a radio frequency (RF) transmitting interface including a plurality of transmitting antennas and configured to transmit the compressed video data to a wireless receiving device; and
   a processor configured to:
   obtain a compression ratio of the video data,
   determine a signal strength state of a signal transmitted from the RF transmitting interface to an RF receiving interface of the wireless receiving device based on the obtained compression ratio, and
   transmit signal strength state information on the determined signal strength state to the wireless receiving device,
   wherein the processor is further configured to acquire a received signal strength indicator (RSSI) measured from the wireless receiving device, and determine the signal strength state based on the RSSI.

2. The wireless transmitting device of claim 1, wherein the signal strength state includes a strong state, a normal state, a low state and disconnected state,
   wherein the processor is configured to determine a state corresponding to the obtained compression ratio among the strong state, the normal state, the low state and the disconnected state.

3. The wireless transmitting device of claim 2, further comprising a memory configured to store a table matching the compression ratio and the signal strength state,
   wherein the processor is configured to determine the signal strength state matched to the obtained compression ratio using the table.

4. The wireless transmitting device of claim 2, wherein the processor is further configured to transmit a control signal for displaying the signal strength state information to the wireless transmitting device.

5. The wireless transmitting device of claim 4, wherein the processor is further configured to:
   detect that the signal strength state is changed and
   transmit, to the wireless receiving device, the control signal for displaying the signal strength state information according to a detection result.

6. The wireless transmitting device of claim 1, wherein the signal strength state information includes a guide image for guiding adjustment of a direction or an angle of the plurality of transmitting antennas provided in the RF transmitting interface.

7. The wireless transmitting device of claim 1, further comprising a memory configured to store a table in which a signal-to-noise ratio (SNR) and the RSSI and the compression ratio are matched with the signal strength state,
   wherein the processor is further configured to acquire the SNR and the RSSI, and determine the signal strength state matched to the acquired SNR, the acquired RSSI, and the obtained the compression ratio using the table.

8. The wireless transmitting device of claim 1, further comprising one or more LEDs,
   wherein the processor is further configured to control a display color of the one or more LEDs to indicate the determined signal strength state.

9. A wireless display system including a wireless transmitting device and a wireless receiving device,
   wherein the wireless transmitting device configured to:
   obtain a compression ratio of video data,
   determine a signal strength state of a signal transmitted from a radio frequency (RF) transmitting interface to an RF receiving interface of the wireless receiving device based on the obtained compression ratio, and
   transmit signal strength state information on the determined signal strength state to the wireless receiving device,
   wherein the wireless receiving device configured to:
   receive and display the signal strength state information,
   wherein the wireless transmitting device further configured to:
   acquire a received signal strength indicator (RSSI) measured from the wireless receiving device, and
   determine the signal strength state based on the RSSI.

10. The wireless display system of claim 9, wherein the signal strength state includes a strong state, a normal state, a low state and disconnected state,
    wherein the wireless transmitting device is configured to determine a state corresponding to the obtained compression ratio among the strong state, the normal state, the low state and the disconnected state.

11. The wireless display system of claim 10, the wireless transmitting device is further comprising a memory configured to store a table matching the compression ratio and the signal strength state,
    wherein the wireless transmitting device is configured to determine the signal strength state matched to the obtained compression ratio using the table.

12. The wireless display system of claim 10, wherein the wireless transmitting device is further configured to:
    detect that the signal strength state is changed and
    transmit, to the wireless receiving device, a control signal for displaying the signal strength state information according to a detection result.

13. The wireless display system of claim 9, wherein the signal strength state information includes a guide image for guiding adjustment of a direction or an angle of a plurality of transmitting antennas provided in the RF transmitting interface.

14. The wireless display system of claim 10, wherein the signal strength state information include a signal strength icon indicating the signal strength state.

15. The wireless display system of claim 14, wherein the signal strength state information further includes picture quality level corresponding to the signal strength state.

* * * * *